United States Patent
Greatwood et al.

(10) Patent No.: US 6,275,549 B1
(45) Date of Patent: Aug. 14, 2001

(54) METHODS AND APPARATUS FOR SYNCHRONIZING A CLOCK

(75) Inventors: Duncan McDougall Greatwood, London; Philip Geoffrey Claridge, Bucks, both of (GB)

(73) Assignee: Madge Networks Limited (GB)

( * ) Notice: Subject to any disclaimer, the term of this patent is extended or adjusted under 35 U.S.C. 154(b) by 0 days.

(21) Appl. No.: 08/813,433

(22) Filed: Mar. 10, 1997

(30) Foreign Application Priority Data

Mar. 13, 1996 (GB) .................................................. 9605299

(51) Int. Cl.[7] .................................................. H04L 7/00
(52) U.S. Cl. .................................... 375/356; 375/219
(58) Field of Search .................................. 375/219, 220, 375/257, 354, 356, 358, 371–373

(56) References Cited

U.S. PATENT DOCUMENTS

| | | | |
|---|---|---|---|
| 4,494,211 | * 1/1985 | Schwartz | 375/356 |
| 4,856,030 | * 8/1989 | Batzer et al. | 375/354 |
| 5,022,050 | * 6/1991 | Tanaka | 375/219 |
| 5,062,124 | * 10/1991 | Hayashi et al. | 375/356 |
| 5,111,451 | * 5/1992 | Piasecki et al. | 375/222 |
| 5,319,678 | 6/1994 | Ho et al. | 375/354 |
| 5,512,938 | 4/1996 | Ohno | 348/15 |
| 5,790,608 | * 8/1998 | Benayoun et al. | 375/356 |

FOREIGN PATENT DOCUMENTS

| | | |
|---|---|---|
| 0 530 846 A2 | 3/1993 | (EP) . |
| 2 182 828 | 5/1987 | (GB) . |

OTHER PUBLICATIONS

U.K. Search Report dated Jun. 2, 1997.

* cited by examiner

Primary Examiner—Young T. Tse
(74) Attorney, Agent, or Firm—Sughrue, Mion, Zinn, Macpeak & Seas, PLLC

(57) ABSTRACT

A method and apparatus for synchronizing a clock between first and second logic blocks (20,21) connected via an asynchronous bus (22). The second logic block includes a clock signal generator (9) responsive to an input synchronizing signal to generate a clock signal synchronized with the synchronizing signal. Data is transferred in blocks from the first logic block (20) to the second logic block (21) across the asynchronous bus (22), the receipt of a data block by the second logic block (21) being used to generate the synchronizing signal.

21 Claims, 2 Drawing Sheets

METHODS AND APPARATUS FOR SYNCHRONIZING A CLOCK

FIELD OF THE INVENTION

The invention relates to methods and apparatus for synchronizing a clock between first and second logic blocks connected by an asynchronous bus wherein the second logic block includes a clock signal generator responsive to an input synchronizing signal to generate a clock signal synchronized with the synchronizing signal.

The invention has application in a variety of fields but is particularly suited to applications in which the logic blocks are incorporated in a PC linked to an external telephone system, for example for providing digital voice links to the telephone system.

BACKGROUND OF THE INVENTION

The basic operation of digital voice links within a telephone system relies on parts of the telephone network operating with a common clock reference signal (typically based around 8 kHz). For example the local telephone exchanges at each end of a conventional telephone call will both use the same clock reference signal to ensure that voice signals converted from analogue to digital form at one exchange are converted back from digital to analogue form at the same rate. Therefore there is no over-run or under-run of digitized voice signals within the digital part of the phone network.

With the advent of digital services such as ISDN it is practical and desirable for the digital phone system to be extended to the user, rather than converting voice signals from analogue to digital form at the first telephone exchange.

By connecting personal computers to the digital telephone network users can make use of the network directly for voice, data and video conferencing. However for correct operation the timing reference signals must still be propagated within the PC to any devices generating or processing data for the digital telephone network. This invention provides inter alia a novel way of maintaining such timing within a PC.

Typically the communications within a personal computer for video conferencing is broken into two modules or logic blocks plugged into the ISA bus (or other standard PC bus). An ISDN network interface on a first card (defining a first logic block) recovers the serial bit stream from the public network. This bit stream then crosses a synchronous interface provided by a ribbon cable (i.e. not via the personal computer asynchronous bus) to a second card (defining a second logic block) that processes the received bit stream for display and compresses the camera input to be passed back along the synchronous interface to the ISDN link.

The synchronous link undertakes two basic functions:
1. Passing the transmit and receive data between the two cards (in this case about 16 Kbytes/sec in each direction).
2. Propagating the timing reference from the public phone network, via the ISDN interface to synchronize the operation of the video codec.

The main problem with this known technique is the requirement for an additional cable to provide a synchronous link between the two cards. This leads to additional mechanical complexity and additional cost.

SUMMARY OF THE INVENTION

In accordance with one aspect of the present invention, we provide a method of synchronizing a clock between first and second logic blocks connected via an asynchronous bus wherein the second logic block includes a clock signal generator responsive to an input synchronizing signal to generate a clock signal synchronized with the synchronizing signal the method comprising transferring data in blocks from the first logic block to the second logic block across the asynchronous bus; and utilizing the receipt of a data block by the second logic block to generate the synchronizing signal.

In accordance with a second aspect of the present invention, we provide apparatus for synchronizing a clock between first and second logic blocks connected by an asynchronous bus wherein the second logic block includes a clock signal generator responsive to an input synchronizing signal to generate a clock signal synchronized with the synchronizing signal the apparatus comprising a first data transfer controller on the first logic block for controlling transfer of data in blocks across the asynchronous bus; and a data block receipt detector on the second logic block for detecting the receipt of a data block and for generating a synchronizing signal related to the receipt of a data block, the synchronizing signal being fed to the clock signal generator on the second logic block.

We have devised a method and apparatus which enables a clock on the second logic block to be synchronized with a clock on the first logic block by utilizing data transfers across the asynchronous bus and thus without the need for a separate ribbon cable.

The synchronizing signal can be generated, inter alia, by the leading or trailing edge of the block of data.

Typically the method further comprises storing data in a memory, for example a FIFO, on the second logic block and reading out data from the memory using the clock signal generated by the clock signal generator of the second logic block. Thus data which is intended for the second logic block can additionally be used for clock synchronization purposes. In some cases, however, dummy data could be transmitted across the asynchronous bus and then discarded once it has been used to synchronize the clock signal generator.

So far, the invention has been described in connection with the transfer of data from the first logic block to the second logic block. In many cases, the method further comprises transferring data from the second logic block to the first logic block using a clock signal generated by the clock signal generator. In this way, two-way communication can be set up which is particularly suitable when the method and apparatus are to be utilized in a telephone environment, either voice or video.

Typically, a second data transfer controller would be provided on either the first or second logic block to enable data to be transferred from the second logic block to the first logic block. Where the second data transfer controller is located on the second logic block then it can be made responsive to the clock signal generated by the clock signal generator.

Conveniently, the first and/or second data transfer controllers comprise direct memory access (DMA) controllers.

In some cases, the first logic block could include a clock signal generator with which the second logic block is to be synchronized. Typically, however, the first logic block will be connected to an external clock signal source, the method causing the clock signal generator on the second logic block to be synchronized with the external clock signal. For example, in the case of a telephone application, the first logic block will be connected to a telephone network to receive data from the network which will be transmitted to the first logic block in accordance with the network clock.

The clock signal generator can take a variety of forms but preferably comprises a phase locked loop (PLL). The PLL is responsive to incoming synchronization signals to generate a clock signal related to the frequency of the synchronizing signals.

In general, it is not essential for every data block transfer to be utilized to generate a synchronizing signal and for this to be periodic but sufficiently frequent to maintain the frequency generated by the clock signal generator at the desired frequency.

In some cases, particularly where the logic blocks are defined by respective PC cards, it is not possible to transfer data directly from one card to the other via the asynchronous bus. In these cases, data is transferred via the asynchronous bus and a host memory (for example of a host PC).

BRIEF DESCRIPTION OF THE DRAWINGS

Some examples of methods and apparatus according to the invention will now be described with reference to the accompanying drawings, in which.

DETAILED DESCRIPTION OF PREFERRED EMBODIMENTS

Figure 1:
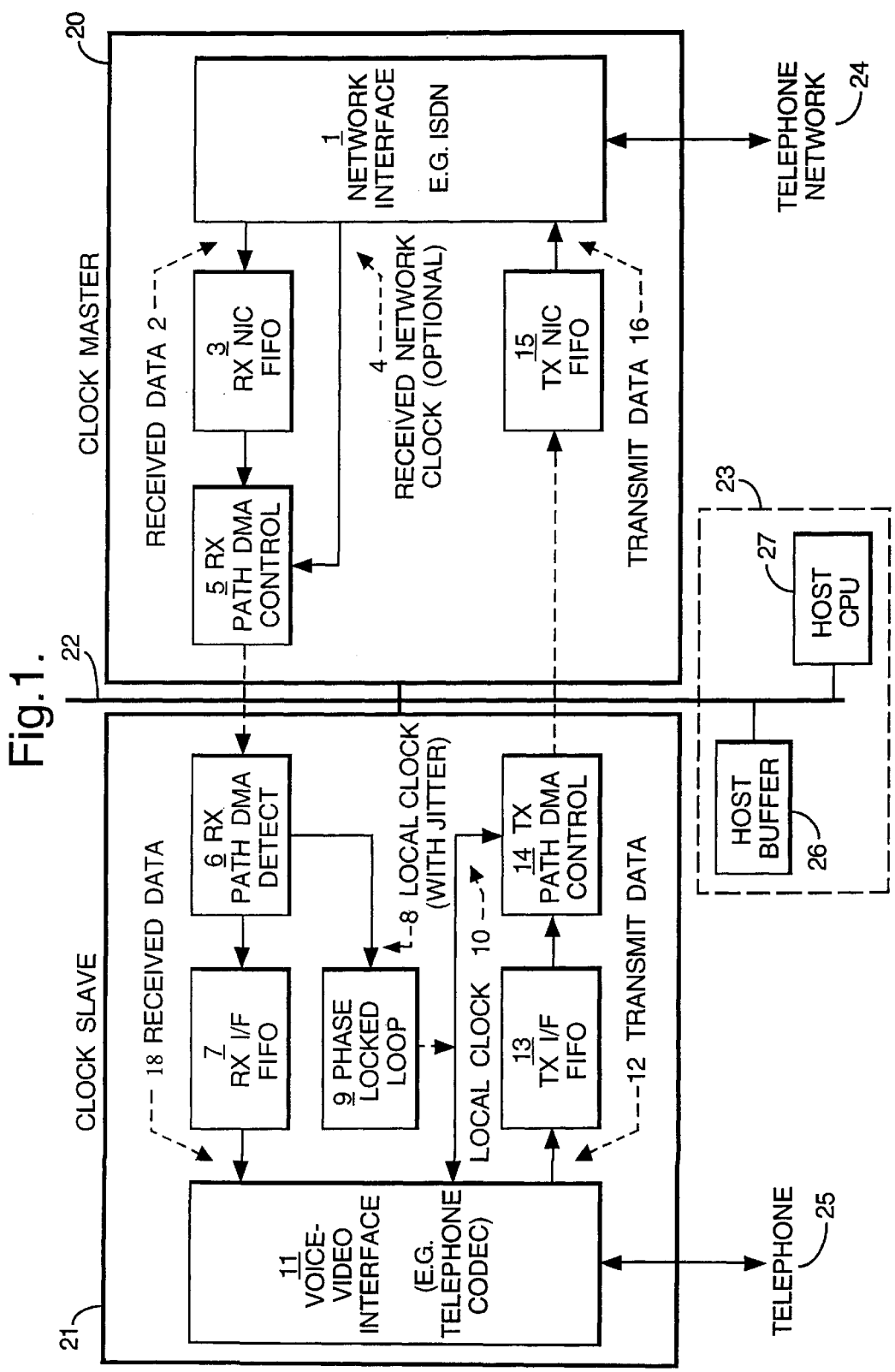
FIG. 1 is a schematic block diagram of a first example of the apparatus.
Figure 2:
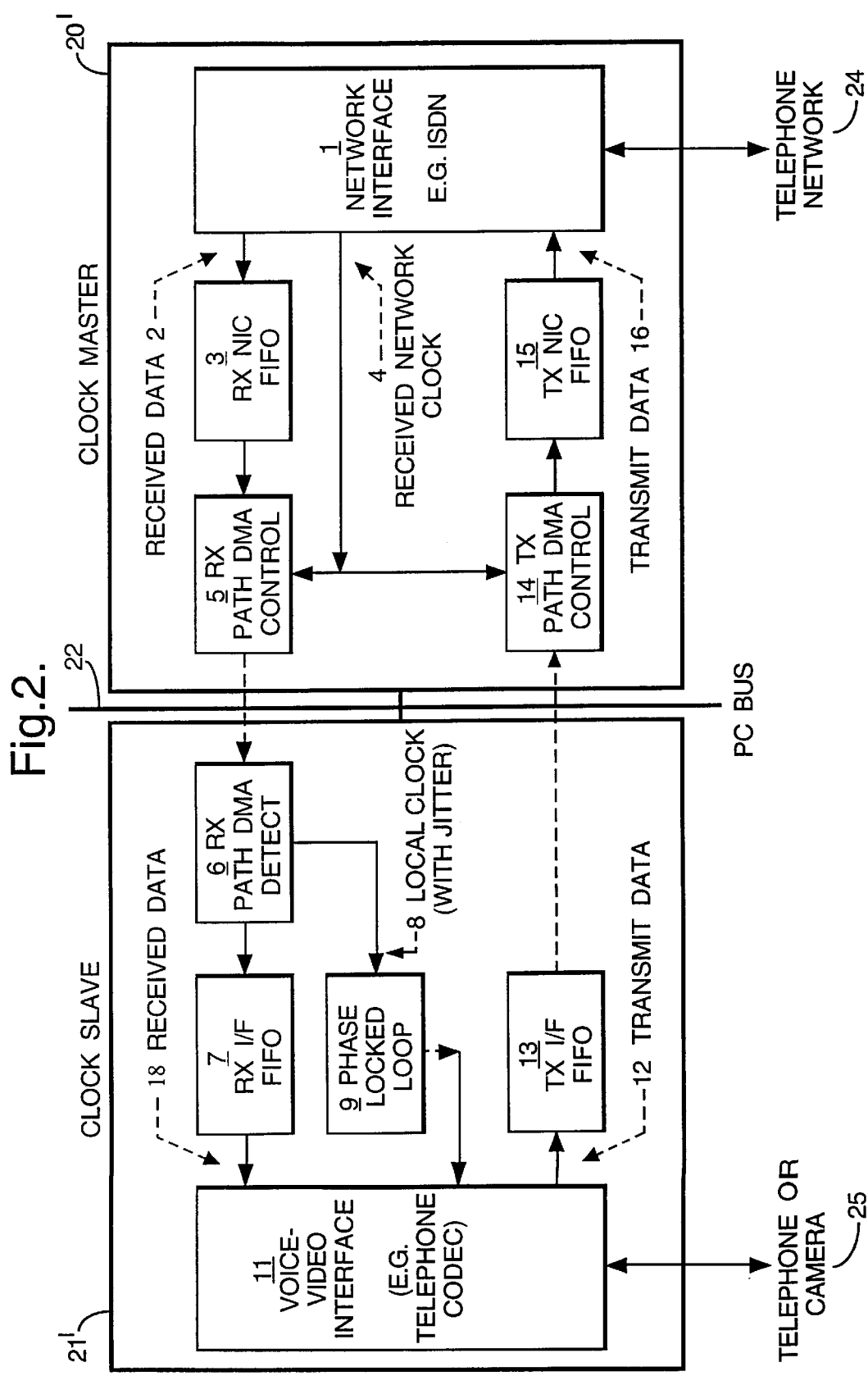
FIG. 2 is a schematic block diagram of a second example.

In each example, a pair of PC adaptor cards 20,21;20',21' defining a "clock master" and a "clock slave" respectively are connected to the asynchronous bus 22 of a PC shown by dashed lines 23 in FIG. 1. In this example, the clock master 20 is connected to a telephone network 24 which transfers data in accordance with a clock reference while the clock slave (in this example a codec for a local telephone handset 25 connected to the clock slave) receives and generates data synchronized with the clock master 20.

In this example, it is assumed that each DMA transfer to be described only transfers 1 byte of data corresponding to one voice sample, where the voice samples are generated at 8000 samples/second (i.e. 64 Kbit/sec in each direction).

In FIG. 1, the clock master card 20 comprises a network interface 1 which connects the card to the telephone network 24. Data is received by the network interface 1 from the telephone network 24, in this example at 8000 bytes/sec. The received data 2 is passed byte by byte into a FIFO 3 through which it passes to a receive path DMA controller 5. Optionally, a receive network clock signal generated by the network interface 1 from the incoming data is also passed to the controller 5.

The controller 5 then indicates to the PC 23 that it wishes to acquire the PC bus 22 for a DMA transfer (either in response to the network clock signal 4, or by sensing data arriving at the head of the FIFO 3, dependent on the implementation).

The received path DMA controller 5, once the bus 22 has been acquired, transfers a byte of data to the clock slave card 21 via the asynchronous bus 22. The arrival of the byte of data is detected by a receive path DMA detector 6 on the card 21, the data being passed to a receive FIFO 7. The receipt of the byte of data by the detector 6 causes the detector to generate a synchronization signal 8 which is fed to a phase locked loop 9. The phase locked loop 9 responds to the synchronization signal 8 to generate a local clock signal 10 which is fed to a voice-video interface circuit 11, in this case a telephone codec. This is connected with a telephone handset. The digital data in the FIFO 7 is converted to analogue form by the interface 11 and is fed to the telephone handset 25 under control of the local clock 10.

Data from the telephone handset 25 which is to be transmitted back to the telephone network 24 is first digitized by the interface 11 and is then fed 12 to a transmit interface FIFO 13. A transmit path DMA controller 14 is provided on the card 21 which, when data is to be sent, acquires the PC bus 22 and following acquisition transfers data from the FIFO 13 across the bus to a transmit FIFO 15 on the card 20. This transfer is under the control of the local clock 10. The FIFO 15 then transfers the data 16 to the interface 1 for onward transmission on the telephone network 24.

The rate at which data is transferred across the asynchronous bus does not have to be equal to the incoming clock signal frequency. It can be an integer or fraction multiple of the incoming clock signal. In the example system above the data stream was byte based, with byte transfers across the bus. In practice it will be desirable to provide some additional buffering within the FIFOs 3,7,13 and 15 to transfer larger bursts across the bus. For example transfers across the bus might be in long-word (4 byte) transfers. In this case the receive path DMA controller 5 would only trigger a transfer when 4 bytes of data were awaiting transfer (or every four clock cycles of the received network clock 4). The PLL 9 would have to incorporate clock multiplication so that the clock 10 passed to voice-video interface 11 was four times the rate DMA transfers were detected from 6.

Suitable buses 22 can be the EISA, IBM micro channel, and PCI buses each of which have sufficient bandwidth to carry the required data traffic load. For example, a PCI bus can carry 200 Mbyte/second.

In some situations the data transferred from the clock master 20 to the clock slave 21 may be ignored. I.e. dummy data is sent to allow the clock slave to synchronize with the clock master, but the data being sent from the clock master to the clock slave is ignored. In this case data might (but need not) be sent from the clock slave to the clock master.

Where the data to be sent to the clock slave 21 is invalid, or data is being sent from the clock master 20 to the clock slave 21 for synchronization purposes, then some transfers may be omitted. Only sufficient transfers need to be made to ensure that the output of the PLL 9 does not drift. The number of samples that may be omitted will depend on the characteristics of the PLL 9.

Should DMA data transfers cease or exhibit excessive drift it is possible in a specific configuration to switch to a local clock (not shown) until synchronization with the external timing reference occurs.

In the example described above, data transfers in each direction between the clock master 20 and clock slave 21 occur directly across the bus 22. In some cases, however, it is more convenient to effect these transfers via one or more host buffers in the PC 23. In this case, the controller 5 transfers data from the FIFO 3 to the host buffer 26 and then sends an interrupt to the host CPU 27 which then copies data in the buffer 26 to the clock slave 21. Alternatively, the interrupt could be sent before data is transferred to the buffer 26.

It should be understood that although the components on the clock master 20 and clock slave 21 are shown as individual elements, in practice they can be implemented in software, each card 20,21 including a suitably programmed microprocessor to simulate the components.

The clock slave 21' has been simplified by moving all the bus control logic for data transfers to the clock master 20'. Thus, the clock master 20' includes the transmit path DMA controller 14 instead of the clock slave 21 as shown in FIG. 1. In this case, the receive network clock 4 is used to drive the transmit path DMA controller 14 to read data to be returned from the clock slave 21' to the clock master 20'. The operation of the data path from the clock master to the clock slave is unchanged, however. Furthermore, the operation of the clock master 20 can be simulated by a CPU and software driven by an appropriate timer and the clock master does not need to respond to DMA transfers.

In the examples above each FIFO was assumed to be 8 bits wide. In practical implementations the FIFOs may include some data path width modification. E.g. FIFO 3 might be loaded from a 16 bit NIC (Network Interface Card) interface and unloaded onto a 32 bit bus interface. The functions of controllers 5,14 will then need to include clock multiplication or division logic as appropriate to match the rates that data is generated and absorbed by the interfaces 1 and 11 with the data block sizes on the PC bus.

The data rates in each direction between the clock master and clock slave need not be equal. E.g. one byte transferred from clock master to clock slave could be used to synchronize 64 returned bytes. This would typically be used in one-way video distribution systems where the forward channel is high-bandwidth video and the return path is only control information. In practical implementations many of the functions (e.g. detector 6 and FIFO 7 may be cascaded together so that the individual functions can not be identified by external analysis of the circuit.

The PLL 9 will normally be implemented as a digital PLL using counters and dividers rather than as analogue components.

There need not be a one to one correspondence between clock masters and clock slaves. One clock master could send data onto the bus that many slaves receive and use to recover synchronization information. Provided the FIFO 15 was duplicated at different memory addresses or some external interlock was provided then such multiple clock slaves could transfer data back to the clock master. Additionally the data blocks transferred in one bus transaction across the PC bus could contain data to be selectively extracted by a number of clock slaves (typically either based on header information in the block or absolute byte position within the block). For example the network interface 1 could be receiving data from a T1 wide area link at 1.544 Mbit/sec. The network interface could load this into the FIFO 3 and the data be sent across the bus by 5 as 24 byte frames corresponding to the 24 byte frames existing on the T1 link. Different clock slaves can then synchronize to the T1 link (i.e. 1.544 Mbit/sec divided by 24) and extract the data from the T1 frame as desired by a particular slave.

It should be noted that jitter could be introduced at any stage from the receipt of data at the network interface to the receipt of the timing signal at the PLL 9. The PLL 9, within its specified characteristics, will lock onto the primary timing signal and this will have the effect of filtering out the jitter.

The apparatus is able to ignore timing signals that have lost synchronization. For example, if a block of data is transferred to the clock slave 21 via the host buffer 26 but fails to maintain priority over the asynchronous bus 22, the associated timing signal will be erroneous and will be ignored.

We claim:

1. A method of synchronizing a clock between first and second logic blocks connected via an asynchronous bus wherein said second logic block includes a clock signal generator responsive to an input synchronizing signal to generate a clock signal synchronized with said synchronizing signal, the method comprising transferring data in blocks from said first logic block to said second logic block across said asynchronous bus; and utilizing the receipt of a data block by said second logic block to generate said synchronizing signal in said second logic block, wherein said synchronizing signal is generated at a time of receipt of said data block.

2. A method according to claim 1, further comprising storing data in a memory of said second logic block and reading out data from said memory using said clock signal generated by said clock signal generator of said second logic block.

3. A method according to claim 1, further comprising transferring data from said second logic block to said first logic block using said clock signal generated by said clock signal generator.

4. A method according to claim 1, wherein data are transferred from said first logic block to said second logic block via a host memory controlled by a host processor.

5. A method according to claim 1, wherein said first logic block is connected to an external clock signal source, the method causing said clock signal generator to be synchronized with an external clock signal generated by said clock signal source.

6. A method according to claim 5, wherein said external clock signal source is provided via a telephone network.

7. A method according to claim 1, wherein data is transferred across said asynchronous bus in a manner that is asynchronous with said clock signal.

8. Apparatus for synchronizing a clock between first and second logic blocks connected by an asynchronous bus wherein said second logic block includes a clock signal generator responsive to an input synchronizing signal to generate a clock signal synchronized with said input synchronizing signal, the apparatus comprising a first data transfer controller on said first logic block for controlling transfer of data in blocks across said asynchronous bus; and a data block receipt detector on said second logic block for detecting the receipt of a data block and for generating a synchronizing signal related to the receipt of the data block, wherein said synchronizing signal is generated at a time of receipt of said data block and is then fed to said clock signal generator on said second logic block.

9. Apparatus according to claim 8, wherein said clock signal generator comprises a phase locked loop.

10. Apparatus according to claim 9, further comprising a second data transfer controller on one of said first and second logic blocks for transferring data from said second logic block to said first logic block.

11. Apparatus according to claim 10, wherein said second data transfer controller is provided on said second logic block and is responsive to said clock signal generated by said clock signal generator.

12. Apparatus according to claim 10, wherein said first and/or second data transfer controller comprises a direct memory access (DMA) controller.

13. Apparatus according to claim 8, further comprising a memory on said second logic block to which data transferred from said first logic block is fed, said clock signal generated by said clock signal generator being used to read out data from said memory.

14. Apparatus according to claim 13, wherein said memory is a FIFO.

15. Apparatus according to claim 8, further comprising an interface on said first logic block for connecting said first logic block to an external clock source which generates an external clock signal.

16. Apparatus according to claim 15, wherein said first data transfer controller extracts said external clock signal from data received at said interface.

17. Apparatus according to claim 8, wherein at least some of the components on one or both of said first and second logic blocks are implemented by a respective, suitably programmed microprocessor.

18. A data transfer system comprising apparatus according to claim 8; and a host processor including a host memory connected to said asynchronous bus, whereby data transfer between said first and second logic blocks is carried out via said host memory.

19. A system according to claim 18, wherein said first logic block is connected to receive data from an external telephone network.

20. Apparatus according to claim 8, wherein said first logic block is connected to receive data from an external telephone network.

21. Apparatus according to claim 8, wherein said first and second logic blocks are configured to transfer data across said asynchronous bus in a manner that is asynchronous with said clock signal.

\* \* \* \* \*